US006412442B1

(12) United States Patent
Bean

(10) Patent No.: US 6,412,442 B1
(45) Date of Patent: Jul. 2, 2002

(54) PET TRAINING APPARATUS AND METHOD

(76) Inventor: David L. Bean, 4300 Bean Rd., Orange, TX (US) 77632

( * ) Notice: Subject to any disclaimer, the term of this patent is extended or adjusted under 35 U.S.C. 154(b) by 0 days.

(21) Appl. No.: 09/316,411

(22) Filed: May 20, 1999

(51) Int. Cl.[7] .............................................. A61K 15/00
(52) U.S. Cl. ...................... 119/701; 119/702; 119/712
(58) Field of Search .................... 119/712, 722–724, 119/753–756, 450, 786, 787, 701, 702, 905, 704, 509, 511, 525, 527, 479, 480, 530, 703, 784; 482/146; 220/212.5, 782, 783, 796, 797

(56) References Cited

U.S. PATENT DOCUMENTS

| | | | |
|---|---|---|---|
| 310,716 A | * 1/1885 | Palmer | 220/212.5 |
| 634,033 A | * 10/1899 | Russell | 220/212.5 |
| 1,260,794 A | * 3/1918 | Paquette | 210/245 |
| 2,039,764 A | * 5/1936 | Barth | 220/212.5 |
| D133,936 S | * 9/1942 | Barnsteiner | D7/391 |
| 3,716,029 A | * 2/1973 | Pillsbury, Jr. | 119/701 |
| 3,779,211 A | * 12/1973 | Etes | 119/753 |
| 4,231,490 A | * 11/1980 | Boudreault | 220/228 |
| 4,257,349 A | * 3/1981 | Carlin | 119/28.5 |
| 4,308,638 A | * 1/1982 | Senussi | 452/54 |
| 4,360,119 A | * 11/1982 | Olivo | 220/522 |
| 5,203,279 A | * 4/1993 | Eversdyk | 119/712 |

FOREIGN PATENT DOCUMENTS

SU 1586634 * 8/1990 ................. 119/786

* cited by examiner

*Primary Examiner*—Peter M. Poon
*Assistant Examiner*—Son T. Nguyen
(74) *Attorney, Agent, or Firm*—Brian C. McCormack; Baker & McKenzie

(57) ABSTRACT

Described is a device that can be used to restrain household pets or other animals, as well as to assist in potty training household pets. Such device is portable, open, and easy to clean. Specifically, the device is a lightweight base upon which the household pet is free to move with a restraining piece such as a strap in the center of the base to which a leash can be attached. The base is sloped from the center to the edge, having a gutter about the periphery of the base. The gutter combined with the sloped base allows easy clean-up of any accidents the pet may have while on the base. The described devices could be used for many different animals and not just well-known domesticated household pets.

20 Claims, 2 Drawing Sheets

PET TRAINING APPARATUS AND METHOD

TECHNICAL FIELD OF THE APPLICATION

This application relates in general to devices for restraining household pets and for house training such pets.

BACKGROUND INFORMATION

Household pet owners are faced with the difficulty of training new pets such as puppies. It is important for the pet owner to train the pet to "use the bathroom" in an appropriate place such as outside or in a litter box. Training such household pets can be a difficult and frustrating task. Newspapers have sometimes been used about the house, or pet owners sometimes just try to keep an eye on their pets at all times, moving the pet to the proper area as soon as the pet shows signs of needing to heed nature's call.

Also, when it is has been desired to restrain a household pet, in the past either a plastic kennel, cage or other enclosure has been used. Such enclosures can be bulky and can sometimes make it difficult to observe the actions of the pet. Furthermore, such enclosures can sometimes be difficult to transport and clean. Still further, if it is difficult to see the pet within the cage or kennel, it will also be difficult to intercept the pet at proper times to get it outside or to the litter box.

SUMMARY OF THE APPLICATION

Described herein a device that can be used to restrain household pets or other animals, as well as to assist in potty training household pets. In embodiments described herein, such a device is portable, open, and easy to clean. Described in this specification is a base upon which the household pet is free to move, with a restraining piece such as a strap in the center of the base to which a leash can be attached. The base is sloped from the center to the edge, having a gutter about the periphery of the base. In the embodiment described, this gutter combined with the sloped base allows easy clean-up of any accidents the pet may have while on the base. Other technical advantages are readily apparent to one skilled in the art from the following figures, description, and claims. While the following figures and description may refer to household pets, the claims should not be limited to any particular type of animal. The devices described and claimed herein could be applied for many different types of animals and not just well-known domesticated household pets.

BRIEF DESCRIPTION OF THE DRAWINGS

For a more complete understanding of the embodiments and the advantages thereof, reference is now made to the following brief description, taken in connection with the accompanying drawings and detailed description, wherein like reference numerals represent like parts, in which.

DETAILED DESCRIPTION OF THE EMBODIMENTS

Figure 1:
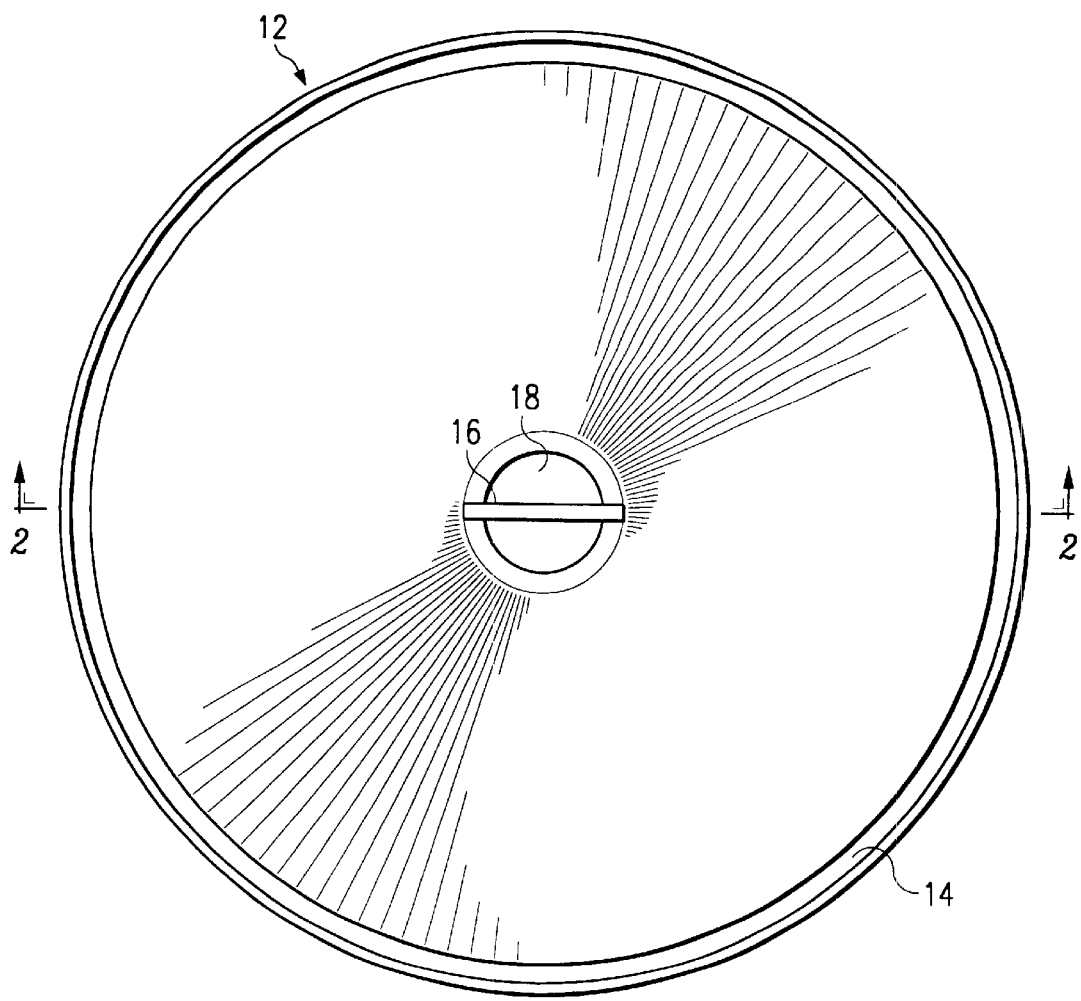
FIG. 1 is a top view of an embodiment, including three exploded views of different aspects of the embodiment.

FIG. 1 is a top view of an embodiment, which includes a circular base 12 and a gutter 14 about the perimeter of the base. Included at the center of the base 12 is a strap 16, which is preferably used as an attachment point for a leash for the pet. Preferably, the strap 16 also serves a handle by which the base 12 can be carried. The base 12 is preferably a circular base having a diameter of approximately 4 feet, although other shapes including regular polygons could be used as effectively as a circular base 12. The base 12 is preferably lightweight and portable, made of a light but durable plastic material. Other materials could also be used such as metal or wood or any other material having the desired durability, ease of cleaning, or portability.

At the center of the base 12, a bowl or indentation 18 is preferably provided. From the top view, this indentation would extend downward into the page as if one were looking at a bowl from the top. This bowl or indentation 18 forms an open space underneath the strap 16 which facilitates attachment of a leash for the pet. The bowl 18 could additionally be used to hold water or other objects, as desired. The gutter 14, strap 16 and the bowl 18 are shown in further detail FIG. 2. Like the base 12, the strap 16 could be formed of a number of materials, such as plastic, metal, wood or other suitable materials. In one embodiment, the strap 16 could be specially contoured to fit a human hand and thereby more greatly facilitate the use of the strap 16 as a handle.

Figure 2:
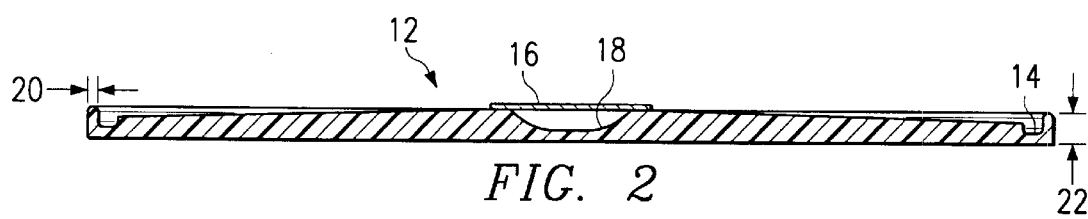
FIG. 2 is a side sectional view of the embodiment of FIG. 1.

The shape of a preferred embodiment device is illustrated in greater detail in the sectional side view of FIG. 2. As can be seen in the figure, the base 12 slopes from the center and specifically from the rim of the bowl 18 down to the gutter 14. This allows any liquids to drain into the gutter for easy clean-up. At the outer perimeter of the gutter, a rim 20 is provided, which is preferably as high or nearly as high as the center of the base. As an example, the center of the base might, for example, be one and one-half inches tall and the outer rim 20 could also be one and one-half inches tall. The actual height chosen for these two dimensions is, of course, not critical, and it can be imagined that many heights could be successfully adapted for this structure.

The center bowl 18 might be 6 inches in diameter and 1 inch deep, as an example. The actual dimensions of the bowl, of course, are also not critical, but the strap 16 should be longer than the diameter of the center bowl 18, although it would be possible to design a strap that would fit within the bowl and thus have a shorter length than the diameter of the bowl. At the very edge of the center of the base 12 next to the gutter 14, ideally, a drop-off of one-half inches is provided for the gutter portion and the gutter 14 is preferably approximately one inch wide. Again, these dimensions are also merely exemplary and a great number of other dimensions could be chosen for the gutter 14.

Figure 3:
FIG. 3 is a side view of the embodiment of FIG. 1.
Figure 4:
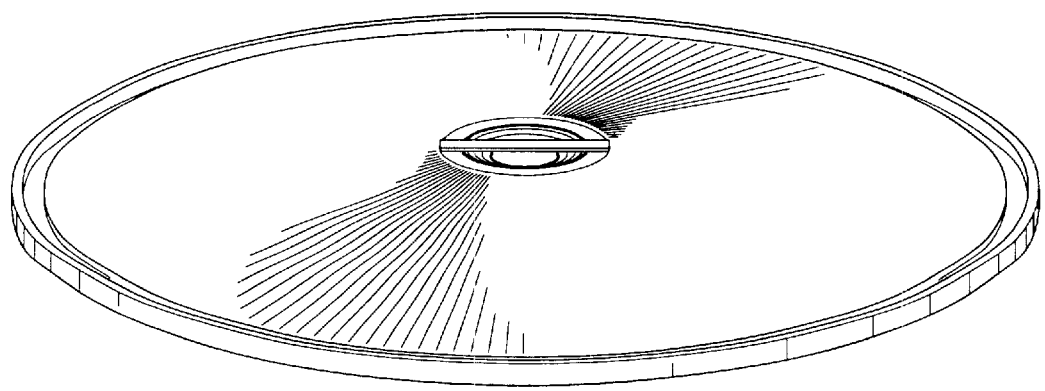
FIG. 4 is a top perspective view of an embodiment.
Figure 5:
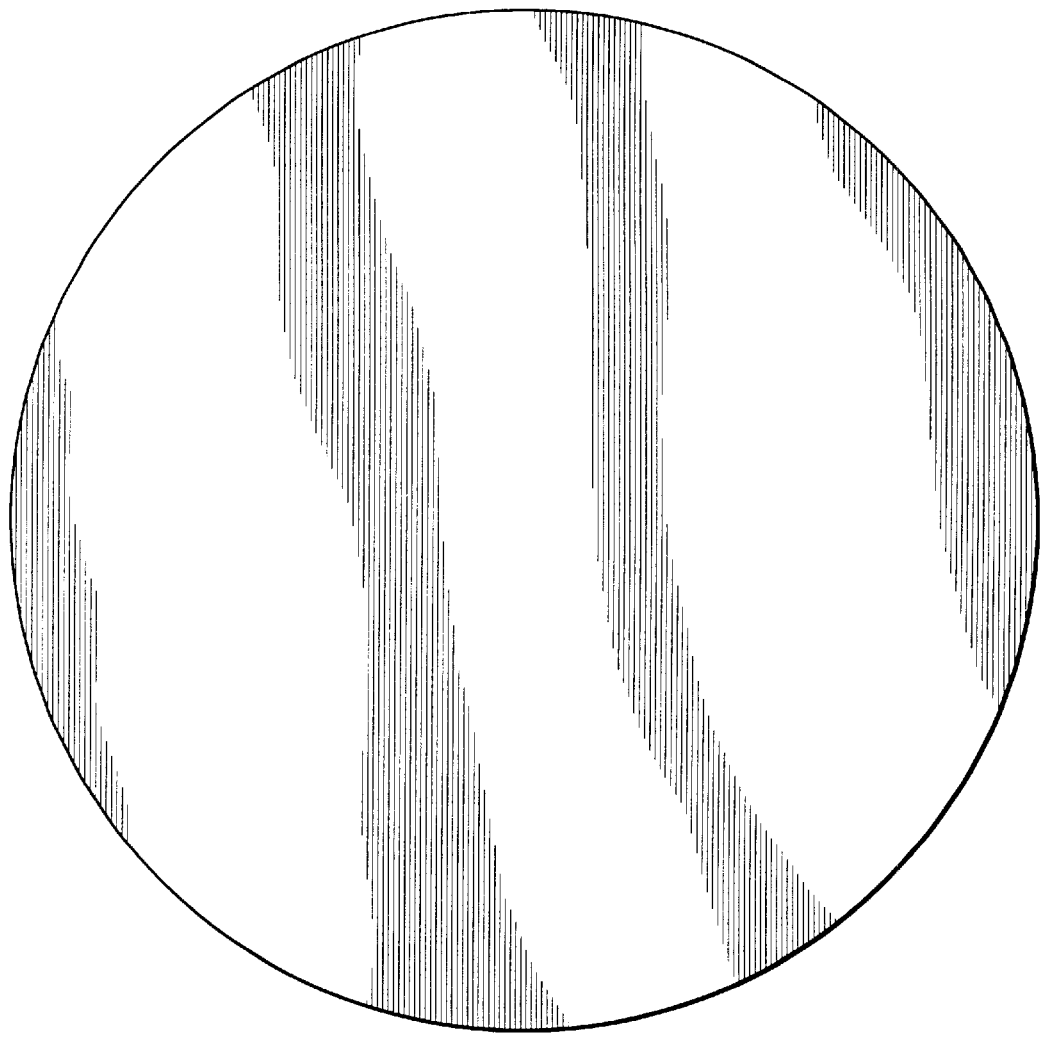
FIG. 5 is a bottom view of an embodiment.

FIG. 3 is a side view of an embodiment wherein the outer rim 22 is the same height as the centermost-portion of the base 12. FIG. 4 is a top perspective view of the device, which is provided to more graphically present the shapes and contours of the device, while FIG. 5 is a bottom view of the device, which is also provided to more graphically present the shapes and contours of the device.

Although the preferred embodiment has been described in detail, it should be understood that various changes, substitutions, and alterations can be made herein without departing from the scope of the present invention, even if all of the advantages identified above are not present. Certain changes, substitutions, and alterations are readily ascertainable by one skilled in the art and could be made without departing from the spirit and scope of the present invention.

What is claimed is:

1. A base for restraining an animal within the perimeter of the base, said base having a center portion and a gutter about the perimeter of the center portion, said center portion having a surface which slopes down from approximately the center of the center portion to the gutter, said base also having a leash attachment point which is confined to the approximate geometric center of the base.

2. The base of claim 1 wherein said center portion has an indentation in it.

3. The base of claim 2 wherein said leash attachment point is a strap which spans the indentation.

4. The base of claim 3 wherein said strap is contoured to facilitate carrying of the base by said strap.

5. The base of claim 1 wherein said base is formed of a lightweight plastic material.

6. The base of claim 1 wherein said base is circular.

7. The base of claim 1 wherein said center portion is circular.

8. The base of claim 1 wherein said center portion has a contoured indentation approximately in its center which is capable of holding liquids.

9. The base of claim 8 wherein said contoured indentation is substantially circular and wherein the diameter of said contoured indentation is substantially smaller than the diameter of the base itself.

10. The base of claim 1 wherein said gutter is capable of holding liquids.

11. The base of claim 1 wherein said base has a diameter of approximately 4 feet.

12. A base for restraining an animal within the perimeter of the base, said base having a center portion and a gutter about the perimeter of the center portion, said center portion having a surface which slopes down from approximately the center of the center portion to the gutter, said gutter being defined at its edges by a drop-off from the outer edge of the center portion and by an outer rim, said base also having a leash attachment point.

13. The base of claim 12, said base having a diameter of approximately 4 feet.

14. The base of claim 12 wherein said base is formed of a lightweight plastic material.

15. The base of claim 12 wherein said drop-off from the outer edge of the center portion to the bottom of said gutter is approximately one-half inch.

16. The base of claim 15 wherein said gutter is approximately one inch wide.

17. The base of claim 12 wherein said outer rim is approximately one and one-half inches tall.

18. The base of claim 12 and further comprising a leash which attaches to said leash attachment point.

19. The method of training a pet, said method comprising:

providing a base having a center portion and a gutter about the perimeter of the center portion, said base also having a leash attachment point which is confined to the approximate geometric center of the base; and connecting a pet leash to said leash attachment point whereby said pet can be restrained within the perimeter of the base.

20. The method of claim 19 wherein said center portion has a contoured indentation approximately in its center which is capable of holding liquids and further comprising placing liquids in said center portion whereby said restrained pet can drink of said liquids.

\* \* \* \* \*